United States Patent Office 2,744,818
Patented May 8, 1956

2,744,818

LOW VOLATILE HERBICIDAL COMPOSITIONS

William R. Davie, Pittsburgh, Pa., assignor to Pittsburgh Coke & Chemical Company, Pittsburgh, Pa., a corporation of Pennsylvania No Drawing. Application December 1, 1954,
Serial No. 472,525

20 Claims. (Cl. 71—2.6)

The present invention relates to a new herbicidal group of esters of a mixture of primary normal saturated $C_7$, $C_8$ and $C_9$ alcohols and the 2-methylisomers thereof with an aryloxypropionic acid selected from the group consisting of $\alpha$ phenoxy propionic acid, $\alpha$ (2-methylphenoxy) propionic acid, $\alpha$ ($\beta$-naphthoxy) propionic acid and halogenated derivatives thereof, and to herbicidal compositions containing such groups of esters as the essential active ingredient.

The invention also comprehends concentrated solvent solutions of such esters and solutions of such solvent solutions in fuel or diesel oil.

The invention further includes aqueous emulsions prepared from such solvent solutions.

FIELD OF INVENTION

In the past few years, numerous synthetic organic compounds have found widespread use in the regulation of plant growth. For example, esters of chloroaryloxyacetic acids and other aryloxy aliphatic acids, their salts and esters have come into prominence as herbicides for the control of broad leaf weeds without injury to narrow leaf grains and certain other narrow leaf plants or ornamental plants. However, selective control of weeds among certain crops continues to remain a problem.

It has been discovered that the new herbicidal esters of the present invention provide improved selective control of weeds, particularly for the control of undesirable vegetation in or around cotton crops, improved selective control of certain species of brush, particularly oak, as well as being improved pre-emergent weed killers.

In order to practicably employ aryloxypropionic acid esters, and in particular, the esters of $\alpha$ (2,4-dichlorophenoxy) propionic acid, $\alpha$ (2,4,5-trichlorophenoxy) propionic acid, $\alpha$ (P-chlorophenoxy) propionic acid, $\alpha$ (2-methyl-4-chlorophenoxy) propionic acid and $\alpha$ ($\beta$-naphthoxy) propionic acid in herbicidal concentrated solvent solutions, it is vital that the solvent solution have many characteristics in addition to its mere ability to act as a herbicide. These characteristics are as follows:

(1) The concentrated solvent solution must be capable of being stored for long periods at low temperatures without having the ester crystallize out from the solution. If crystallization does occur, redissolution may be difficult. The presence of crystals in the concentrated solvent solution at the time of spraying leads to clogging of the spray equipment, renders accurate control of the distribution of the herbicide very difficult, decreases the effectiveness of a given quantity of herbicidal solution, and generally renders the solution unsatisfactory from a practical standpoint. Any effort to concentrate the solvent solution to as great an extent as possible antagonizes the problem of avoiding crystallization, since the original solution at normal temperatures would be closer to its saturation point. The need for low volatility further complicates this problem in view of the fact that low volatility is generally related to high molecular weight, which in turn is normally accompanied by solidity (high melting point) and limited solubility. A practical solvent solution should contain at least about four pounds of the acid in the form of the ester in a gallon of solution and must remain homogeneous at least down to temperatures of about 0° F.

(2) The solvent solution must be soluble in oils having low aromatic content. Since efficient application of the subject herbicides frequently requires the application of a fuel or diesel oil solution of the herbicide, it is essential that the ester selected have a high solubility in these oils which are generally poor solvents.

(3) It is vital that the ester possess low volatility. High volatility permits drift of the herbicidal vapors to susceptible plants, the injuring of which is not desired. There are, however, practical limits to the selection of a low volatile ester. The difficulty of mere resort to higher molecular weight esters has already been discussed in connection with the cold stability of the concentrated solvent solution, but it should additionally be noted that resort to esters of high molecular weight reduces the acid equivalency of the ester so that a greater weight of ester must be dissolved to make available in the solution a given quantity of the aryloxypropionic acid group. Consequently, mere resort to higher molecular weight esters means that more of a less soluble material must be maintained in solution. The increased cost of the high molecular weight alcohols necessary for the production of high molecular weight esters is another factor which makes it undesirable to resort to the simple expedient of utilizing high molecular weight esters.

(4) Herbicidal solvent solutions should have relatively low specific gravity (the specific gravity should not be too different from the specific gravity of water), so that stable emulsions can be readily produced. In other words, what is here required is that the specific gravity of the ester itself be approximately 1.2 or lower, and that the ester be soluble in a solvent having a specific gravity between 0.8 and 1.0 so that the solution of the ester in the solvent will have a specific gravity approximately equal to 1.0.

OBJECTS

A principal object of the present invention is the provision of a novel group of esters possessing herbicidal characteristics.

A more specific object of the invention is to provide a unique group of esters from a mixture of alcohols which have been found to be peculiarly adapted for the preparation of herbicides.

Further objects include:

(1) The provision of such esters which have very low vapor pressure, and at the same time, (a) have a relatively high acid equivalency, and (b) are highly soluble in conventional solvents so that concentrated solvent solutions may be prepared, capable of being stored for long periods at low temperatures without having the ester crystallize out from the solution and if crystallization does occur, the ester will redissolve easily when normal temperatures are restored.

(2) The provision of such esters as aforementioned, which esters are soluble in oils of low aromatic content so that oil solutions of the same may be prepared.

(3) The provision of such esters as aforementioned, concentrated solvent solutions of which will have a specific gravity approximately equal to 1.0 so that stable aqueous emulsions may be prepared from the same.

(4) The provision of such esters as aforesaid, which can be produced by a rapid esterification process.

(5) The provision of such esters as aforementioned, which esters provide improved selective control of undesirable vegetation, particularly in or around cotton crops, improved control of certain species of brush, particularly oak, and improved pre-emergent control of weeds.

Further objects will be apparent from the listing of necessary characteristics in addition to mere herbicidal activity given hereinbefore, and the detailed description given hereinafter.

GENERAL DESCRIPTION

These objects are accomplished according to the present invention by the provision of the esters of an aryloxypropionic acid selected from the group consisting of phenoxypropionic acid, $\alpha$(2-methylphenoxy) propionic acid, $\alpha$($\beta$-naphthoxy) propionic acid and halogenated derivatives thereof, with a mixture of alcohols comprising primary normal saturated $C_7$, $C_8$ and $C_9$ alcohols and the 2-methyl isomers thereof.

These objects are preferably accomplished by the provision of new mixtures of esters of $\alpha$(2,4-dichlorophenoxy) propionic acid, $\alpha$(2,4,5-trichlorophenoxy) propionic acid, $\alpha$(P-chlorophenoxy) propionic acid, $\alpha$(2-methyl-4-chlorophenoxy) propionic acid and $\alpha$($\beta$-naphthoxy) propionic acid with a mixture of primary normal saturated $C_7$, $C_8$ and $C_9$ alcohols and the 2-methyl isomers thereof.

Such esters are compounded with solvents, extenders, wetting agents, other herbicidal materials or the like to form new herbicidal compositions.

The success of the present invention is due to a large extent to the discovery that the aforesaid mixture of esters, in addition to possessing herbicidal properties, are unique in that they have (1) low volatility, (2) relatively high acid equivalency, (3) are readily soluble in conventional solvents, which solubility is maintained to an unusual extent at low temperatures, (4) are soluble on oils of low aromatic content, (5) have a specific gravity under 1.2, (6) have an improved selectivity for the control of weeds and brush and (7) are improved pre-emergence weed killers. Consequently, it has been found that the esters of aryloxypropionic acids with a mixture of primary normal saturated $C_7$, $C_8$ and $C_9$ alcohols and the 2-methyl isomers thereof and, in particular, the $\alpha$(2,4-dichlorophenoxy) propionic acid, $\alpha$(2,4,5-trichlorophenoxy) propionic acid, $\alpha$(P-chlorophenoxy) propionic acid, $\alpha$(2-methyl-4-chlorophenoxy) propionic acid and $\alpha$($\beta$-naphthoxy) propionic acid esters with the aforesaid mixture of alcohols have the aforementioned attributes for use as herbicides or for the formation of herbicidal compositions.

EXAMPLES

A more complete understanding of the new products and compositions of this invention may be had by reference to the following illustrative examples of actual operations in accordance with the invention:

Example 1

A mixture of esters of primary normal saturated $C_7$, $C_8$ and $C_9$ alcohols and the 2-methyl isomers thereof with $\alpha$(2,4,5-trichlorophenoxy) propionic acid may be prepared by heating under reflux with stirring for one hour and forty-five minutes a mixture of 539 grams (2.0 mols) of $\alpha$(2,4,5-trichlorophenoxy) propionic acid, 265 grams (2.1 mols) of a mixture of primary normal saturated $C_7$, $C_8$ and $C_9$ alcohols and the 2-methyl isomers thereof, 0.8 milliliter of concentrated sulfuric acid, and 150 milliliters of benzene. Suitable apparatus for performing the reaction may be equipped with a water trap so that the water produced by the reaction between the acid and the mixture of alcohols and which is distilled off together with the refluxing benzene may be withdrawn from the condensate before returning the benzene to the reaction vessel. After separation of the mixture of esters from the benzene, which may be accomplished by distilling off the more volatile benzene, the material was heated under reduced pressure (20 mm.) to about 140° C. and filtered. The yield of the mixture of esters was 791 grams having a purity of 95.7% and hence, the yield was 99% of the amount of the ester which theoretically could have occurred. The mixture of esters so produced has a boiling point of approximately 150° C. at 0.2 mm. pressure and a specific gravity of 1.194 at 25° C. The mixture of esters is immiscible with water but miscible in all proportions in fuel oil. The mixture of esters could not be crystallized at temperatures as low as 0° F. and ester formulations containing four pounds per gallon equivalent of this mixture of esters also failed to show any signs of crystallization when stored for a prolonged period, i. e., three weeks, at temperatures of 0° F.

Other aryloxypropionic acid esters of a mixture of primary normal saturated $C_7$, $C_8$ and $C_9$ alcohols and the 2-methyl isomers thereof may be prepared in the same manner. The properties of representative esters are as follows:

$\alpha$(2,4-dichlorophenoxy) propionic ester
  B. P. 129° C. at 0.09 mm. pressure
  Sp. G. 1.142 at 24° C.
$\alpha$(P-chlorophenoxy) propionic ester
  B. P. 111° C. at 0.08 mm. pressure
  Sp. G. 1.069 at 25° C.
$\alpha$(2-methyl-4-chlorophenoxy) propionic ester
  B. P. 120° C. at 0.11 mm. pressure
  Sp. G. 1.057 at 25° C.
$\alpha$($\beta$-naphthoxy) propionic ester
  B. P. 139° C. at 0.08 mm. pressure
  Sp. G. 1.045 at 25° C.

Of the aforementioned esters neither the distilled ester nor ester formulations containing four pounds per gallon equivalent of the corresponding acids have crystallized at temperatures as low as 0° F. The esters and ester formulations are miscible in all proportions with fuel oil. The formulations emulsify readily in water and produce stable emulsions.

The above procedure when applied to the production of other esters, such as the tetrahydrofurfuryl esters, showed significantly slower esterification rates. The tetrahydrofurfuryl ester of $\alpha$(2,4,5-trichlorophenoxy) propionic acid prepared in the same manner was found to have a melting point of 26–27° C. and four pounds per gallon formulations of the acid as the ester were not cold stable. When stored at 0° F., crystallization took place and the ester did not go completely into solution until a temperature of 10° C. was reached. The ester and fuel oil were miscible in the range of 20–50% or higher concentrations of the ester in fuel oil, but in the range of about 5–10% concentrations of the ester in fuel oil a very hazy solution was produced indicating a difference in fuel oil solubility as compared to the esters of the present invention.

The mixture of primary saturated normal $C_7$, $C_8$ and $C_9$ alchols and 2-methyl isomers thereof employed in the foregoing example was a mixture of alcohols having the general formula:

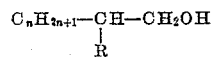

where R is selected from the group consisting of hydrogen and methyl radicals and where $n$ is a number from 5–7 minus the number of carbon atoms in R (where R is hydrogen, $n$ may vary between 5 and 7 and where R is a methyl group, $n$ will vary between 4 and 6). This mixture of primary normal saturated $C_7$, $C_8$ and $C_9$ alcohols together with their 2-methyl isomers is commercially available as "Alphanol 79" having the following typical analysis:

| Test | Typical Analysis |
|---|---|
| Flash point (Abel closed cup) | 140° F. |
| Vapor pressure at 120° C | 94 mm. Hg. |
| Heat capacity at 100° C | 0.63 av. cals./gm. |
| Specific gravity at 20° C./4° C | 0.8340. |
| Density at 20° C | 8.34 lb./Imperial gallon. |
| Coefficient of cubic expansion per ° C. over range 20–60° C. | $8.07 \times 10^{-4}$. |
| Refractive Index $n_D^{20}$ | 1.4310. |
| Viscosity at 20° C | 9.0 centipoises. No crystal formation at $-60°$ C. |
| Solubility of alcohols in water at 20° C | 0.05% maximum. |
| Solubility of water in alcohols at 20° C | 0.9%. |
| Solubility in organic solvents | Miscible with most organic solvents. |
| Surface Tension at 18.5° C | 28.2 dynes/cm. |

*Example II*

The mixture of esters of α(2,4,5-trichlorophenoxy) propionic acid with a mixture of primary normal saturated $C_7$, $C_8$ and $C_9$ alcohols and the 2-methyl isomers thereof produced in Example I may be employed to produce a concentrated solvent solution by dissolving 64.6% by weight of the ester mixture in 29.4% of a high boiling naphtha and then adding 6.0% of a nonionic (substituted polyoxyethylene) type emulsifier. Suitable emulsifying agents are nonionic emulsifiers such as those mentioned in the United States patent to Jones, No. 2,390,941 of December 11, 1945. The mixing may be conducted at room temperature. The concentrated solvent solution so prepared is a free flowing liquid even at temperatures below 0° F. The mixture of esters of α(2,4,5-trichlorophenoxy) propionic acid with a mixture of primary normal saturated $C_7$, $C_8$ and $C_9$ alcohols and the 2-methyl isomers thereof of Example I may be used in conjunction with esters of other herbicidal acids to provide a concentrated solvent solution of esters of a plurality of herbicidal acids. For example, 32.3% by weight of the mixture of esters of α(2,4,5-trichlorophenoxy) propionic acid of Example I may be mixed with 34.4% of the mixture of esters of 2,4-dichlorophenoxyacetic acid with a mixture of primary normal saturated $C_7$, $C_8$ and $C_9$ alcohols and the 2-methyl isomers thereof of Example I, 6.0% of an emulsifying agent and 27.3% of a high boiling naphtha to provide a suitable concentrated solvent solution of a mixture of herbicidal esters.

*Example III*

The concentrated solvent solutions of Example II may be dissolved in an oil solvent such as fuel oil, diesel oil or kerosene by mixing one gallon of the solution in 25 gallons of oil. The mixture is homogeneous, and does not separate when agitation is stopped, after mixing has taken place.

The mixture of oil and solvent solution so prepared may be employed upon stumps, used for dormant applications, and is effective against difficult-to-kill plants. A customary method of application of the above mixture is to apply the same as a spray from a plane, so that 26 gallons of the mixture is applied to four acres.

*Example IV*

The concentrated solvent solutions of Example II may be formed into a herbicidal aqueous emulsion useful for application to weeds and brush. The emulsion may be produced by mixing 3 quarts of the concentrated solvent solution with 100 gallons of water, and agitating slightly to give a uniform emulsion. This emulsion is quite stable and will remain as such with little or no further agitation.

As indicated above, the present esters possess low volatility, coupled with a sufficiently high acid equivalency. In addition, these esters are soluble in fuel oil, will yield concentrated solvent solutions containing at least four pounds per gallon equivalent of herbicidal acids from which the ester will not crystallize out upon prolonged storage at temperatures as low as 0° F., and will produce, when emulsified with water, an emulsion of good stability. It has been found that especially unique characteristics of the present esters are that they have (1) improved selective control of weeds particularly for the control of undesirable vegetation in or around cotton crops, (2) improved selective control of certain species of brush and in particular hardwoods such as oak and (3) improved pre-emergence control of weeds.

The mixture of alcohols of the present invention may contain in addition to the aforesaid normal and 2-methyl isomers, small amounts of other primary saturated branched chain $C_7$, $C_8$ and $C_9$ isomers as well as small amounts of secondary and tertiary alcohols. The presence of other isomers in small quantity is not especially noticeable while the presence of secondary and tertiary alcohols, while not unduly harmful, is not desirable.

A typical mixture of primary normal saturated $C_7$, $C_8$ and $C_9$ alcohols and 2-methyl isomers thereof for use in the present invention is as follows, in which approximately equal proportions of normal and 2-methyl isomers are contained in the mixture.

| | |
|---|---|
| n-Heptanol+2-methyl hexanol-1 | 45% |
| n-Octanol+2-methyl heptanol-1 | 43% |
| n-Nonanol+2-methyl octanol-1 | 12% |
| Analysis: | |
| Hydroxyl value | 13.4% OH |
| Aldehyde content | 0.10% max. |
| Acid value | 0.05% mg. KOH/gm. max. |
| Water content | 0.5% max. |
| Average molecular weight | 127 |
| Boiling range at 760 mm. Hg: | |
| 2% by volume | 165° C. |
| 98% by volume | 220° C. |

In accordance with conventional practice, the herbicidal aryloxypropionic acid esters of the present invention may be used alone or in conjunction with one another, with esters of other herbicidal acids, as well as in admixture with other herbicidal ingredients. For example, the ester of α(2,4,5-trichlorophenoxy) propionic acid with the alcohol mixture of the present invention may be used in admixture with either the esters of the present invention or other esters of either α(2,4-dichlorophenoxy) propionic acid, α(P-chlorophenoxy) propionic acid, α(2-methyl-4-chlorophenoxy) propionic acid, or α(β-naphthoxy) propionic acid, as well as esters of the chloroaryloxyacetic acids. A 1:1 ratio of the mixture of esters of the present invention of α(2,4,5-trichlorophenoxy) propionic acid and the esters of 2,4-dicholorphenoxyacetic acid with a mixture of primary normal saturated $C_7$, $C_8$ and $C_9$ alcohols and the 2-methyl isomers thereof being illustrative.

Suitable solvents which may be employed for the purpose of compounding a concentrated solvent solution with the new esters of the subject invention are water insoluble or nearly water insoluble esters such as dibutyl phthalate, amyl acetate and the like, high boiling petroleum naphthas within the boiling range of about 100° to about 400° C. (the common petroleum naphthas that are generally used boil in the range of from 150° to 300° C.), kerosene or other hydrocarbon oils such as methylated naphthalene and xylene. Co-solvents such as dimethyl ketone and isopropyl alcohol may be employed, but it should be noted that the use of water-soluble co-solvents decreases the efficiency of emulsification of the concentrates. Suitable emulsifying agents have been previously referred to, and common nonionic emulsifiers which are commercially available, such as derivatives of polyoxyethylene, are generally used.

Spreading agents and adhesives may also be employed, but because of the ability of the esters of the present invention to spread by themselves and resist washing off, these agents are not necessary.

The concentration of the herbicidal agent in the solvent may vary greatly, e. g., 5% to 95%, and still realize herbicidal activity. However, practicable solutions must be highly concentrated, and should contain at least approximately four pounds of the herbicidal acid as the ester per gallon of total solution of the ester in the solvent.

Aqueous emulsions of the concentrated solvent solution generally contain from one to twenty-five quarts of the solution for each one hundred gallons of water. In such aqueous emulsions, ion sequestering agents, such as ethylene diamine tetra-acetic, citric or glycollic acids or the like, may be employed, particularly when hard water is used.

I claim:

1. As a new herbicidal mixture of esters, the mixture of esters having the formula

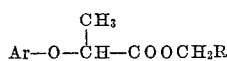

where Ar is an aryl group selected from the group consisting of phenyl, 2-methyl-phenyl, beta naphthyl and the aryl nucleus chlorinated derivatives thereof and R is a mixture of alkyl radicals containing substantial amounts of each of normal, saturated $C_6$, $C_7$ and $C_8$ groups and the 2-methyl isomers thereof.

2. A process of controlling the resprouting of oaks comprising applying to the oak the herbicidal ester of claim 1.

3. The process of controlling undesirable vegetation around cotton crops comprising applying to the cotton crops the herbicidal ester of claim 1.

4. As a new herbicidal mixture of esters, the mixture of esters having the formula

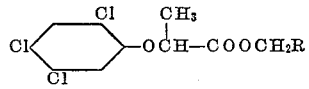

where R is a mixture of alkyl radicals containing substantial amounts of each of normal, saturated $C_6$, $C_7$ and $C_8$ groups and the 2-methyl isomers thereof.

5. As a new herbicidal mixture of esters, the mixture of esters having the formula

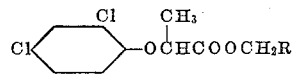

where R is a mixture of alkyl radicals containing substantial amounts of each of normal, saturated $C_6$, $C_7$ and $C_8$ groups and the 2-methyl isomers thereof.

6. As a new herbicidal mixture of esters, the mixture of esters having the formula

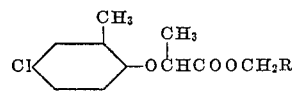

where R is a mixture of alkyl radicals containing substantial amounts of each of normal, saturated $C_6$, $C_7$ and $C_8$ groups and the 2-methyl isomers thereof.

7. A herbicidal composition containing as the active ingredient the mixture of esters having the formula

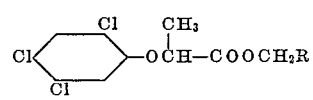

where R is a mixture of alkyl radicals containing substantial amounts of each of normal, saturated $C_6$, $C_7$ and $C_8$ groups and the 2-methyl isomers thereof.

8. A herbicidal composition containing as the active ingredient the mixture of esters having the formula

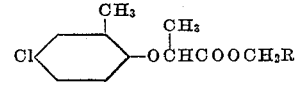

where R is a mixture of alkyl radicals containing substantial amounts of each of normal, saturated $C_6$, $C_7$ and $C_8$ groups and the 2-methyl isomers thereof.

9. A cold stable herbicidal concentrated solvent solution containing a herbicidal mixture of esters of low volatility comprising at least four pounds of equivalent acid as the ester per gallon of solution, said mixtures of esters having the formula

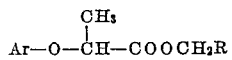

where Ar is an aryl group selected from the group consisting of phenyl, 2-methylphenyl, beta naphthyl and the aryl nucleus chlorinated derivatives thereof and R is a mixture of alkyl radicals containing substantial amounts of each of normal, saturated $C_6$, $C_7$ and $C_8$ groups and the 2-methyl isomers thereof.

10. A concentrated solvent solution as recited in claim 9 in which the solvent has a specific gravity of between 0.8 and 1.0.

11. A concentrated solvent solution as recited in claim 9 in which the solvent is a high boiling naphtha.

12. A concentrated solvent solution as recited in claim 9 in which the solvent is kerosene.

13. A composition as recited in claim 9 in which the said concentrated solvent solution is mixed with an oil of low aromatic content.

14. A composition as recited in claim 13 in which the oil is fuel oil.

15. A composition as recited in claim 13 in which the oil is diesel oil.

16. A cold stable herbicidal concentrated solvent solution containing a herbicidal mixture of esters of low volatility comprising at least four pounds of equivalent acid as the ester per gallon of solution, said esters having the formula

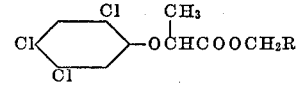

where R is a mixture of alkyl radicals containing substantial amounts of each of normal, saturated $C_6$, $C_7$ and $C_8$ groups and the 2-methyl isomers thereof.

17. A cold stable herbicidal concentrated solvent solution containing a herbicidal mixture of esters of low volatility comprising at least four pounds of equivalent acid as the ester per gallon of solution, said esters having the formula

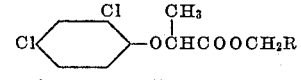

where R is a mixture of alkyl radicals containing substantial amounts of each of normal, saturated $C_6$, $C_7$ and $C_8$ groups and the 2-methyl isomers thereof.

18. A cold stable herbicidal concentrated solvent solution containing a herbicidal mixture of esters of low volatility comprising a solvent solution containing at least four pounds of equivalent acid as the ester per gallon of solution, said esters having the formula

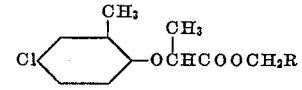

where R is a mixture of alkyl radicals containing substantial amounts of each of normal, saturated $C_6$, $C_7$ and $C_8$ groups and the 2-methyl isomers thereof.

19. A herbicidal composition comprising an aqueous emulsion of a concentrated solvent solution of a herbicidal mixture of esters containing at least four pounds of equivalent acid as the ester per gallon of solution, said esters having the formula

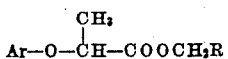

where Ar is an aryl group selected from the group consisting of phenyl, 2-methylphenyl, beta naphthyl and the aryl nucleus chlorinated derivatives thereof and R is a mixture of alkyl radicals containing substantial amounts of each of normal, saturated $C_6$, $C_7$ and $C_8$ groups and the 2-methyl isomers thereof.

20. A herbicidal composition comprising an aqueous emulsion of a concentrated solvent solution of a herbicidal mixture of esters containing at least four pounds of equivalent acid as the ester per gallon of solution, said mixture of esters having the formula

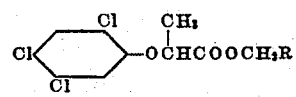

where R is a mixture of alkyl radicals containing substantial amounts of each of normal, saturated $C_6$, $C_7$ and $C_8$ groups and the 2-methyl isomers thereof.

References Cited in the file of this patent

UNITED STATES PATENTS 2,396,513    Jones ------------------ Mar. 12, 1946

OTHER REFERENCES

"Agricultural Chemicals," Dec. 1952, page 26.